Patented Nov. 15, 1938

2,136,544

UNITED STATES PATENT OFFICE 2,136,544

TRANSPARENT COATED SHEET MATERIAL

Erich Gebauer-Fuelnegg, deceased, late of Evanston, Ill., by Marie Gebauer-Fuelnegg, Evanston, Ill., administratrix, and Eugene W. Moffett, Pittsburgh, Pa., and Edouard M. Kratz, Chicago, Ill., assignors to Marbon Corporation, Gary, Ind., a corporation of Delaware No Drawing. Original application April 26, 1934, Serial No. 722,510. Divided and this application January 14, 1938, Serial No. 184,956

4 Claims. (Cl. 91—68)

This invention relates to transparent coated sheet or film material and to a method of preparing the same. More particularly, this invention relates to the manufacture of thin, transparent, composite sheet material having the requisite degree of flexibility and pliability to render it suitable for use as a wrapping.

As is well known, transparent sheet material has heretofore been made from a large number of different materials, including colloidal proteins, such as gelatin, or glue and casein; from cellulosic derivatives, such as cellulose nitrate, cellulose acetate, regenerated cellulose and cellulose ethers; and from many other types of substances. In the copending application of Erich Gebauer-Fuelnegg and Eugene W. Moffett, Serial No. 708,429, filed January 26, 1934, there is also described a thin transparent sheet material made from the hydrochloride derivatives of natural, or synthetic rubber, or rubber-like compounds, including the polymerized butadiene compounds.

In general, however, some of the more commonly known transparent sheets or films when formed as a single ply film, lack certain desirable properties, such as imperviousness toward the transmission of water vapor, gases, or grease, or lack the desired degree of clarity, transparency, or flexibility under various temperature and humidity conditions.

It is well known, for instance, that protein base films, such as films prepared from gelatin or casein, and cellulosic films, such as regenerated cellulose films, are relatively sensitive to extremes of climatic conditions of temperature and humidity, and, further, that such films are not by themselves sufficiently resistant to the transmission of water vapor, gases, or grease to make them entirely satisfactory for particular wrapping purposes. It is for this reason that such base films are sometimes provided with a coating of a moistureproof character, such as a nitrocellulose coating containing small quantities of waxy substances, gums, resins, or the like, or mixtures thereof.

The copending application of Erich Gebauer-Fuelnegg, Louis K. Eilers and Eugene W. Moffett, entitled "Transparent sheet material and coating therefor", Serial No. 666,222, filed April 14, 1933, discloses, a coating composition for transparent films prepared from the reaction product of rubber and a metal halide. Our invention includes the use of such a coating composition in the manufacture of transparent coated sheet material.

We have now found that various base films may be improved with respect to their resistance to the penetration of water vapor, gases and greases, by coating the same with a firmly adhering pellicle, or thin layer of substances obtained from a polymerized butadiene, such as may be prepared by the reaction between rubber and rubber-like compounds with metal halides, hydrogen halides, or free halogens.

We have also found, conversely, that if the base film is prepared from a polymerized butadiene compound, such as one of those just referred to, or other rubber derivatives, the transparency and clarity of such base films in some instances may be greatly improved by applying thereto a coating of various film forming materials, such as the colloidal proteins, gelatin, casein, zein and the like, or cellulose derivatives, such as the esters and ethers of cellulose.

A method of increasing the transparency and clarity of rubber hydrochloride sheet and film material is disclosed in our copending application Serial No. 704,050, filed December 26, 1933. Our copending application Serial No. 722,510, filed April 26, 1934, of which this application is a division, is a continuation in part of application Serial No. 704,050.

This invention therefore relates to transparent sheet material of a composite or multi-ply character, the plies, or layers of which, however, are firmly bonded together. In its preferred form, one of the constituent plies comprises a film of rubber hydrochloride. Composite films embodying our present invention possess certain distinctive advantages over the single layer type of film either with respect to the imperviousness of the sheet material toward the transmission of water vapor, gases, grease, or the like, or with respect to the degree of transparency, clarity or brilliance of the sheet material.

It is therefore an important object of our invention to provide a transparent sheet material of a composite or multiply character, wherein the plies are firmly bonded together and possess different properties and characteristics which supplement each other to produce a sheet material particularly adapted for wrapping purposes.

It is a further important object of this invention to provide a thin, transparent, flexible film or sheet material prepared by uniting two or more films of different composition, one of the constituent films or plies comprising the reaction or end product of a polymerized butadiene compound, such as natural or synthetic rubber, or rubber-like compounds, with a halogen or a halogen containing compound.

Other and further important objects of this invention will become apparent from the following description and appended claims.

In general, our invention contemplates the formation of transparent, composite sheet material by first forming a relatively transparent film or sheet, for convenience referred to as the base film or sheet, and then coating such film or sheet with a pellicle or layer of material that is likewise transparent. As will later be explained in more detail, however, the same composition that may in one instance be employed in forming the base film, may likewise be employed as a coating for a base film of different composition.

The base film is preferably made in a single continuous operation by casting a solution of the film forming material onto a smooth, highly polished surface from which the base film, formed upon the evaporation of the solvent, or as otherwise formed, may be readily stripped. Suitable types of base films may be prepared from colloidal proteins, such as gelatin or casein, and the like, by methods already known to the art or as described in the following patents and pending applications:

Hoskins Patent No. 1,764,839; Kratz Patent No 1,847,656; Kratz Patent No. 1,893,172; Kratz et al. application, Serial No. 630,406, filed August 25, 1932; and Kratz et al. application, Serial No. 668,808, filed May 1, 1932.

A suitable base film may also be prepared from cellulose derivatives, such as the esters or ethers of cellulose, regenerated cellulose, cellulose acetate, cellulose nitrate, ethyl cellulose, and the like. The art of making cellulosic derivative films is well known and requires no detailed description.

We also contemplate the use of base films prepared from polymerized butadiene compounds by the reaction of such compounds with a halogen or compounds containing halogen. More specifically, our invention contemplates the use of a rubber hydrogen halide, such as rubber hydrochloride. The method of forming rubber hydrochloride is described more fully in the copending application of Erich Gebauer-Fuelnegg and Eugene W. Moffett, Serial No. 708,429, filed January 26, 1934, or may be found in the literature.

A suitable type of coating for any of these base films is described in the copending application of Erich Gebauer-Fuelnegg, Louis K. Eilers and Eugene W. Moffett, entitled "Transparent sheet material and coating therefore", Serial No. 666,222, filed April 14, 1933. The coating compositions therein referred to under the trade names of Pliolite and Plioform are prepared from the reaction products of rubber, or rubber-like compounds of the polymerized butadiene type, and a metal halide, such as tin tetrachloride. In the preparation of such reaction products and similar products, crude rubber, either milled or unmilled, is dissolved in a suitable solvent, such as benzene, to give a rubber cement. This rubber cement is then treated with a metal halide, such as tin tetrachloride or the like, and the reaction allowed to proceed until the mass has been reduced in viscosity to a suitable point. An end product may then be precipitated by the addition of alcohol or acetone, but preferably it is steam distilled from the reaction mass and the product thus obtained is dried. The composition of the end product depends upon the point at which the reaction has been interrupted, but in general the end product contains only a minor proportion of chlorine and its properties are probably due not so much to the chlorine content as to the altered structure of the rubber molecule itself.

In order to further illustrate our invention, if the base film is characteristically a protein film, such as gelatin, casein or zein, such a base film may be coated with the end product, prepared as above described from the reaction of rubber and a metal halide, dissolved in benzene to a solids content between 1½ and 5%, and preferably about 3%. Other solvents than benzene, such as naphtha may be employed for dissolving the coating material. Preferably a low boiling solvent is used that is not capable of dissolving the material of the base film.

If the base film is largely composed of a cellulosic derivative, such as regenerated cellulose, the coating composition may suitably comprise a solution of the end product just described in naphtha. The concentration of the coating solution should be between 1½ and 15% of solids by weight of the mixture, and preferably about 3%.

If the base film is to be a rubber hydrochloride film, we prefer to use the method of application Serial No. 708,429 above referred to. According to that application, rubber hydrochloride, prepared by the reaction between rubber and liquid hydrogen chloride or hydrogen chloride gas under pressure and in the absence of a solvent, is dissolved in a suitable solvent, such as benzene or ethylene dichloride, to a desired concentration. This solution is then cast on a smooth endless surface and the solvent evaporated to leave a thin, transparent film of rubber hydrochloride. Plasticizers, fillers and ageing resisters or anti-oxidants may be added to the film composition.

However, when other methods of preparing rubber hydrochloride are used, unless the rubber or rubber hydrochloride is carefully purified to remove foreign substances, such as proteins, resins or the like, the sheet or film material formed from the rubber hydrochloride will frequently exhibit a slightly milky or cloudy effect, sometimes referred to as a haze or fog, and will not be so clearly transparent and brilliant as is desirable when the sheet material is to be used for wrapping purposes. Such clouds, hazes or fogs are encountered, for example, if the rubber hydrochloride is unsatisfactorily purified, or the sheet material cast and dried at relatively high humidities or too low temperatures to obtain high clarity and transparency.

According to our present invention, we have found that the clarity and transparency of rubber hydrochloride sheet or film material may be greatly increased by applying a relatively thin coating or pellicle of a transparent film forming material of different composition to one or both surfaces of the rubber hydrochloride sheet.

More particularly, we have found that where rubber hydrochloride sheet or film material is formed by casting a solution of the rubber hydrochloride onto a smooth surface, the sheet frequently has irregularities on the surface opposite that in contact with the casting surface and these irregularities impair the transparency and clarity of the sheet. The transparency and clarity of the sheets may, however, in accordance with our present invention, be greatly improved by coating only the surface having these irregularities with a solution of transparent film forming material dissolved in a solvent that is not a solvent for the rubber hydrochloride base sheet or film.

The following types of film forming materials may be employed in coating the base film of rubber hydrochloride, for example:

Protein—
   Gelatin, casein, and zein.
Cellulosic derivatives—
   Cellulose nitrate, cellulose acetate, regenerated cellulose, ethyl cellulose.
Chlorinated diphenyls.
Hydrogenated rubber.
Cyclo rubbers.
Natural and synthetic gums, waxes and resins and combinations thereof.
End product from the reaction between rubber and a metal halide.
Chlorinated rubber.

As specific examples of the composition of gelatin and casein films that may successfully be employed for coating a rubber hydrochloride base film, reference is made to the issued patents and pending applications listed previously.

Of the various cellulosic derivatives, we have found that cellulose nitrate may be most satisfactorily employed for coating a rubber hydrochloride base film. The following example illustrates a preferred formula for the nitrocellulose coating solution (percentages being by weight of the mixture except in the case of the solvents):

Solids—
  2½% chlorinated diphenyl.
  2½% nitrocellulose (regular ½ sec. soluble cotton).
Solvents—
  95% mixed solvents.
  40% solvent naphtha (by vol.).
  60% ethyl acetate (by vol.).

The chlorinated diphenyl used in the foregoing formula serves as a plasticizing and anchoring agent for the nitrocellulose film. In place of using chlorinated diphenyls alone, the following mixture may be employed:

5% paraffin wax.
  45% dammar gum.
  50% chlorinated diphenyl (technically known as "hard arochlor 4465").

It will also be understood that other solutions of nitrocellulose in various solvents, employing various plasticizing and anchoring agents known to the art and various waxes and wax-like substances, either in admixture with gums and resins or by themselves, may be used for coating purposes.

When the end product isolated from the reaction mass of rubber and tin tetrachloride is applied to a base film of rubber hydrochloride, the coating solution may be prepared by dissolving the end product in naphtha up to a concentration of about 10% by weight of the solution. Various natural and synthetic gums and resins, waxy substances and the like may be added to the coating solution, if desired.

The coating operations may be carried out in any of the usual ways, such as by dipping, in a tower coater, or by doctoring or "wicking" the coating solution onto one of both sides of the base film. The solvent used in the coating composition is preferably one that is easily volatilized at a relatively low temperature and one that is not a good solvent for the base film or sheet.

In order to illustrate the further scope of our invention, the following table is given as showing the types of film forming materials that may be used as the base film and as the coating film or pellicle:

| Base film | Coating film |
|---|---|
| Protein layer<br>  Gelatine<br>  Casein<br>  Zein | Rubber derivatives<br>  Rubber chloride<br>  Rubber hydrochloride<br>  End product from the reaction between rubber and a metal halide |
| Cellulosic derivatives<br>  Cellulose nitrate<br>  Cellulose acetate<br>  Regenerated cellulose<br>  Alkyl or aryl celluloses | Rubber derivatives<br>  Rubber chloride<br>  Rubber hydrochloride<br>  End product from the reaction between rubber and a metal halide |
| Rubber derivatives<br>  Rubber hydrochloride | Protein<br>  Gelatine<br>  Casein<br>  Zein<br>Cellulosic<br>  Cellulose nitrate<br>  Cellulose acetate<br>  Regenerated cellulose<br>  Ethyl cellulose<br>Diphenyls (chlor)<br>Hydrogenated rubber, or hydro rubber<br>Cyclo-rubber, or polyclorubber<br>End product from the reaction between rubber and a metal halide<br>Rubber chloride |
| Starch derivatives<br>  Starch<br>  Starch esters<br>  Starch ethers | Protein<br>  Zein<br>  Gliadin<br>  Hordein<br>Cellulosic derivatives<br>  Cellulose ethers<br>  Cellulose esters<br>Rubber derivatives<br>  Rubber chloride<br>  Rubber hydrochloride<br>End product from the reaction between rubber and a metal halide. |

It will be understood that in using any particular coating ingredient for application to a specific base film, a coating ingredient will be selected that gives the desired properties to the coated article and a solvent for the coating ingredient will be selected that is not a good solvent for the ingredients of the base film.

As will be apparent from a consideration of the foregoing chart, in each of the combinations of base films and coating pellicles embodying our invention, at least one of the constituent sheets, films or plies of the composite sheet is composed largely of a rubber derivative, such as a halide, hydrogen halide, or an end product prepared from the reaction of a metal halide with rubber or a rubber-like compound. In general films prepared from these various rubber derivatives all have the very desirable property of being resistant to the penetration of water, water vapor, gases and greases.

Some of the rubber hydrochloride films when prepared as a single integral and uncoated film, however, have a tendency, previously referred to, of exhibiting a slight cloudiness or foggy appearance. For this reason we prefer to coat the rubber hydrochloride films with a relatively thin pellicle of one of the other film forming materials. In this way, the cloudiness of the base film of the rubber hydrochloride is cleared up and a beautifully transparent, clear and sparkling sheet is obtained.

Where the base film or sheet of rubber hydrochloride is coated on both sides, ageing of the rubber hydrochloride base film is largely prevented. Suitable coating solutions for this purpose may be prepared from natural and artificial gums and resins and waxy substances. For instance, a coating of chlorinated diphenyl applied to both sides of the rubber hydrochloride base film is effective in retarding aging of the base film.

The coating of the rubber hydrochloride base film with any of the film forming materials above enumerated also serves to eliminate static and thus aids in the handling of the rubber hydrochloride film or sheet material when used on automatic wrapping and bag forming machines.

Although this invention has been described as applied to rubber hydrochloride sheet or film material specifically, it will be understood that the method herein described is applicable to other hydrohalides of rubber and rubber-like compounds of natural or synthetic origin. The term "rubber" as used herein and in the claims is intended to cover generically rubber itself and the chief rubber-like constituents of natural or synthetic rubber, balata, gutta percha and the like.

We are aware that numerous details of the process may be varied through a wide range without departing from the principles of this invention, and we therefore, do not purpose limiting the patent granted hereon otherwise than necessitated by the prior art.

We claim:
1. Transparent composite sheet material comprising a flexible casein sheet enveloped in a thin coating of rubber hydrochloride.
2. Transparent composite sheet material comprising a film layer of casein having firmly anchored thereto a second layer of a rubber hydrochloride.
3. Transparent composite sheet material comprising a base ply of casein and a coating thereon of a rubber hydrohalide.
4. A thin transparent and flexible wrapping sheet comprising a base ply of casein having anchored thereon a thin pellicle of rubber hydrochloride.

MARIE GEBAUER-FUELNEGG,
*Administratrix of the Estate of Erich Gebauer-Fuelnegg, Deceased.*
EUGENE W. MOFFETT.
EDOUARD M. KRATZ.